(12) United States Patent
Zhang et al.

(10) Patent No.: US 12,184,113 B2
(45) Date of Patent: Dec. 31, 2024

(54) CHARGE METHOD FOR BATTERY, STORAGE MEDIUM, AND TERMINAL

(71) Applicant: HuiZhou TCL Mobile Communication Co., Ltd., Guangdong (CN)

(72) Inventors: Shuisha Zhang, Guangdong (CN); Peng Ye, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 589 days.

(21) Appl. No.: 17/619,601

(22) PCT Filed: Dec. 20, 2019

(86) PCT No.: PCT/CN2019/127066
§ 371 (c)(1),
(2) Date: Dec. 16, 2021

(87) PCT Pub. No.: WO2021/114380
PCT Pub. Date: Jun. 17, 2021

(65) Prior Publication Data
US 2022/0385091 A1    Dec. 1, 2022

(30) Foreign Application Priority Data
Dec. 10, 2019  (CN) .......................... 201911261630.3

(51) Int. Cl.
*H01M 10/44*   (2006.01)
*H01M 10/46*   (2006.01)
*H02J 7/00*    (2006.01)

(52) U.S. Cl.
CPC ......... *H02J 7/00714* (2020.01); *H01M 10/44* (2013.01)

(58) Field of Classification Search
CPC ................. H02J 7/00714; H02J 7/0069; H02J 7/007182; H01M 10/44; H01M 10/448
USPC .......................... 320/107, 116, 132, 148, 149
See application file for complete search history.

(56) References Cited

U.S. PATENT DOCUMENTS

| 8,384,390 B2 * | 2/2013 | Zhang .................. | G01R 31/396 320/152 |
| 10,283,987 B1 * | 5/2019 | Wang .................. | H02J 7/00714 |
| 2011/0074433 A1 * | 3/2011 | Zhang .................. | G01R 31/396 324/429 |
| 2012/0139476 A1 | 6/2012 | Evans et al. | |

FOREIGN PATENT DOCUMENTS

| CN | 1732607 | 2/2006 |
| CN | 102474114 | 5/2012 |
| CN | 103219769 | 7/2013 |
| CN | 104269902 | 1/2015 |
| CN | 204167943 | 2/2015 |
| CN | 106786940 | 5/2017 |
| CN | 106877435 | 6/2017 |
| CN | 206313483 | 7/2017 |
| CN | 107681718 | 2/2018 |
| CN | 108429312 | 8/2018 |
| CN | 110266085 | 9/2019 |
| CN | 110416643 | 11/2019 |
| EP | 1507326 | 2/2005 |
| JP | 2012-186951 | 9/2012 |
| TW | 201405999 | 2/2014 |

OTHER PUBLICATIONS

International Search Report and the Written Opinion Dated Sep. 7, 2020 From the International Searching Authority Re. Application No. PCT/CN2019/127066 and Its Translation of Search Report Into English. (8 Pages).
Notification of Office Action and Search Report Dated Nov. 27, 2020 From the State Intellectual Property Office of the People's Republic of China Re. Application No. 201911261630.3. (9 Pages).
Notification of Office Action and Search Report Dated Jul. 2, 2021 From the State Intellectual Property Office of the People's Republic of China Re. Application No. 201911261630.3 and Its Translation of Office Action Into English. (19 Pages).
Dong, "Mobile Phone Repair Technology", Thirteenth Five-Year Plan for Higher Vocational Education, p. 10, Jun. 30, 2016 & English Abstract.
Kong et al., "A Design of Protective Chip for Lithium Ion Battery", Journal of Wuxi Institute of Commerce, 8(6): 102-104, Dec. 31, 2008 & English Abstract.

* cited by examiner

*Primary Examiner* — Edward Tso (57) ABSTRACT

A charge method for a battery, a storage medium, and a terminal are provided and include: acquiring a discharge current of the battery when the battery is in a charge state; determining whether the discharge current is smaller than a predetermined current threshold value; if yes, determining whether the discharge current is in a stable state within a predetermined time period; and selecting a target voltage from a plurality of sample voltages in a predetermined voltage set according to a result of the stable state, adopting the target voltage as a charge voltage to charge the battery, and continuing to perform the determining whether the discharge current is smaller than the predetermined current threshold value.

20 Claims, 4 Drawing Sheets

CHARGE METHOD FOR BATTERY, STORAGE MEDIUM, AND TERMINAL

RELATED APPLICATIONS

This application is a National Phase of PCT Patent Application No. PCT/CN2019/127066 having International filing date of Dec. 20, 2019, which claims the benefit of priority of Chinese Patent Application No. 201911261630.3 filed on Dec. 10, 2019. The contents of the above applications are all incorporated by reference as if fully set forth herein in their entirety.

FIELD AND BACKGROUND OF THE INVENTION

The present disclosure relates to the technology field of mobile terminals, and more particularly to a charge method for a battery, a storage medium, and a terminal.

In usually conditions, the capacity of a battery is decayed with the increasing of the number of times of charge and discharge, and the performance of the battery is also decreased. Accordingly, the life of the battery is limited. That is, the number of times of charge and discharge which the battery can reach is also limited.

With the improvement of the battery technology, more and more electronic products adopt the lithium ion battery technology. A deep charge, a deep discharge, a shallow charge, and a shallow discharge of a lithium ion battery have approximately the same effect on the life of the lithium ion battery. Accordingly, in the prior art, when the lithium ion battery is fully charged and a charger is not unplugged, a charge state of the battery enters a mode in which the charge, the discharge, and the charge are cyclic. The use life of the battery is affected significantly.

SUMMARY OF THE INVENTION

Embodiments of the present disclosure provide a charge method and a device for a battery, a storage medium, and a terminal to increase use life of a battery.

An embodiment of the present disclosure provides a charge method for a battery including:
  acquiring a discharge current of the battery when the battery is in a charge state;
  determining whether the discharge current is smaller than a predetermined current threshold value;
  if yes, determining whether the discharge current is in a stable state within a predetermined time period; and
  selecting a target voltage from a plurality of sample voltages in a predetermined voltage set according to a result of the stable state, adopting the target voltage as a charge voltage to charge the battery, and continuing to perform the determining whether the discharge current is smaller than the predetermined current threshold value.

Correspondingly, an embodiment of the present disclosure provides a charge device for a battery including:
  an acquiring unit configured to acquire a discharge current of the battery when the battery is in a charge state;
  a determining unit configured to determine whether the discharge current is smaller than a predetermined current threshold value;
  a stability determining unit configured to determine whether the discharge current is in a stable state within a predetermined time period; and
  a processing unit configured to select a target voltage from a plurality of sample voltages in a predetermined voltage set according to a result of the stable state, adopt the target voltage as a charge voltage to charge the battery, and continue to perform the determining whether the discharge current is smaller than the predetermined current threshold value.

Optionally, in some embodiments, the charge device for the battery can further includes a stopping unit.

The stopping unit is configured to stop charging the battery when a charge current of the battery is smaller than a charge cut-off current, after the target voltage is adopted as the charge voltage to charge the battery.

Correspondingly, an embodiment of the present disclosure further provides a computer readable storage medium. The storage medium stores computer programs. The computer programs are called by a central processing unit to perform the steps in the charge method for the battery in any one embodiment of the present disclosure.

Correspondingly, an embodiment of the present disclosure further provides a terminal including a central processing unit and a storage device. The storage device stores computer programs. The computer programs are called by the central processing unit to perform the steps in the charge method for the battery in any one embodiment of the present disclosure.

Embodiments of the present disclosure provide a charge method and a device for a battery, a storage medium, and a terminal to increase use life of a battery.

BRIEF DESCRIPTION OF THE SEVERAL VIEWS OF THE DRAWINGS

In order to more clearly illustrate the embodiments or the technical schemes in the prior art, the following drawings of the embodiments or in the prior art will be briefly introduced. It is obvious that the drawings are merely some embodiments of the present disclosure, those skilled in the art may derive other drawings according the drawings described below without creative endeavor.

DESCRIPTION OF SPECIFIC EMBODIMENTS OF THE INVENTION

A clear and complete description of the technical schemes in the embodiments of the present disclosure is made in conjunction with the accompanying drawings in the embodiments of the present disclosure. The described embodiments are merely a part and not all of the embodiments of the present disclosure. Based on the embodiments of the present disclosure, all other embodiments acquired by those skilled in the art without any creative endeavor are within the scope of protection of the present disclosure.

Embodiments of the present disclosure provide a charge method and a device for a battery, a storage medium, and a terminal.

Detailed explanations are described as follows. It is noted that a described order of the following embodiments does not serve as limitations of a preferred order of the embodiments.

The present embodiment is described from the angle of a charge device for a battery. The charge device for the battery can be embodied to be integrated into a network device. The network device can be a server, a terminal and so on. The terminal can include a smart mobile phone, a tablet and so on.

A charge method for a battery includes: receiving a battery charge instruction; acquiring a discharge current of the battery when the battery is in a charge state; determining whether the discharge current is smaller than a predetermined current threshold value; if yes, determining whether the discharge current is in a stable state within a predetermined time period; and selecting a target voltage from a plurality of sample voltages in a predetermined voltage set according to a result of the stable state, adopting the target voltage as a charge voltage to charge the battery, and continue to perform the determining whether the discharge current is smaller than the predetermined current threshold value.

Figure 1:
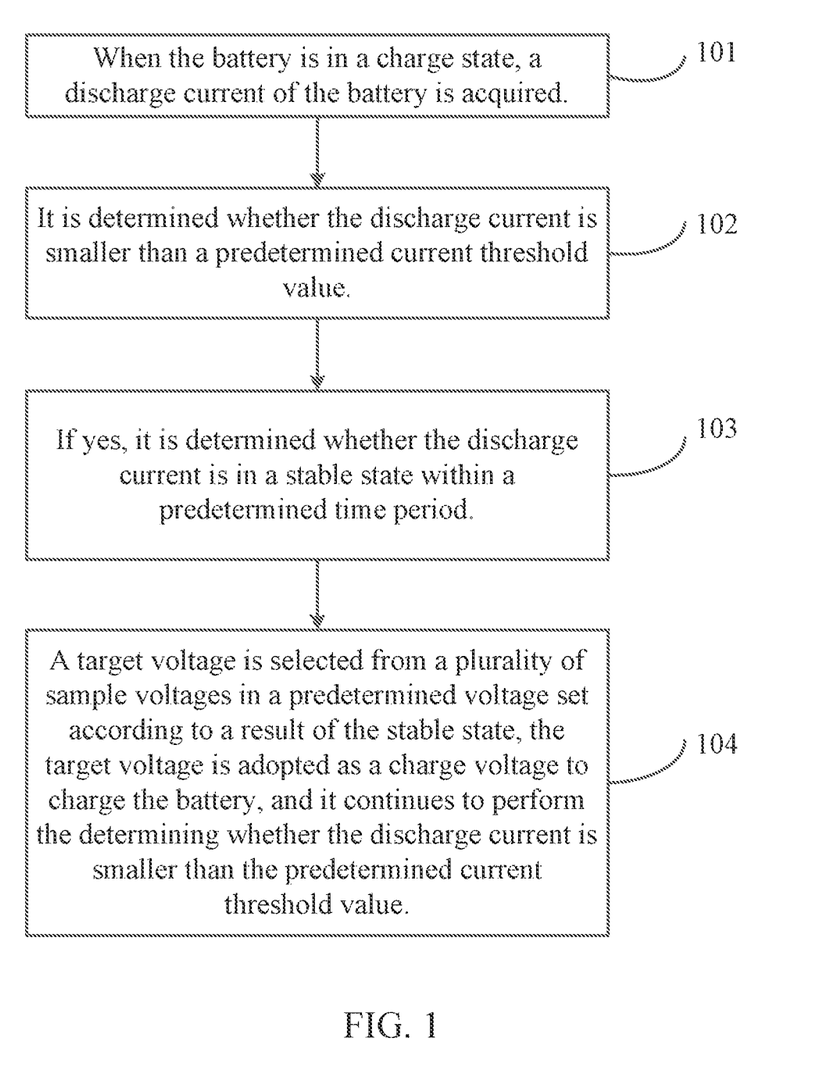
FIG. 1 illustrates a first flow chart of a charge method for a battery provided by an embodiment of the present disclosure.

Please refer to FIG. 1. FIG. 1 illustrates a first flow chart of a charge method for a battery provided by an embodiment of the present disclosure. A detailed process is described as follows.

In step 101, when the battery is in a charge state, a discharge current of the battery is acquired.

In some embodiments, in a situation that the battery is continuously connected to an external power source, a state of the battery can be the charge state, a charge completion state, or a discharge state. When the battery is in the charge state, the discharge current of the battery is ranged from 0 milliampere (mA) to 100 milliamperes. Accordingly, the discharge current of the battery can be acquired by measuring the discharge current of the battery with a multimeter selecting 100-milliampere range. A method of acquiring the discharge current of the battery can include other methods and is not repeated herein.

In step 102, it is determined whether the discharge current is smaller than a predetermined current threshold value.

In some embodiments, the predetermined current threshold value can be correspondingly set up by those skilled in the art. In practical applications, the predetermined current threshold value relates to a range of the above-mentioned discharge current. For example, the above-mentioned discharge current of the battery is ranged from 0 mA to 100 mA, and thus the predetermined current threshold value can be 100 mA.

In step 103, if yes, it is determined whether the discharge current is in a stable state within a predetermined time period.

In some embodiments, when the discharge current is smaller than the predetermined current threshold value, stability of the present discharge current within the predetermined time period is monitored. For example, a timer can be set up within this discharge process, and time of the timer can be set as 15 minutes. An average value of the discharge current of the battery within 15 minutes is measured. When the discharge current does not have a jump change after a calculation, it is determined that the discharge current is in the stable state within 15 minutes.

In step 104, a target voltage is selected from a plurality of sample voltages in a predetermined voltage set according to a result of the stable state, the target voltage is adopted as a charge voltage to charge the battery, and it continues to perform the determining whether the discharge current is smaller than the predetermined current threshold value.

In some embodiments, the selecting the target voltage from the plurality of sample voltages in the predetermined voltage set according to the result of the stable state can include: selecting the target voltage from the plurality of sample voltages in the predetermined voltage set according to the present discharge current, when the discharge current is in the stable state within the predetermined time period; and remaining a present charge voltage, when the discharge current is not in the stable state within the predetermined time period.

In some embodiments, based on step 103 of monitoring the stability of the discharge current, when the discharge current is not in the stable state within the predetermined time period, a reason of this situation is large power consumption of the battery of a user's terminal. Accordingly, the discharge current has a jump change, and the charge voltage of the battery is changed as well. It is necessary to remain the present charge voltage.

In some embodiments, when the discharge current is in the stable state within the predetermined time period, a system of the terminal might be in a standby state and there is no large power consumption. The battery enters a mode of adjusting a predetermined voltage. For example, the predetermined voltage can be a re-charged voltage. The re-charged voltage refers to that the battery restores to be charged when a voltage of the battery is smaller than the re-charged voltage. An offset voltage can be regarded as an inherent error parameter and usually depends on a software setting. A rated voltage of the battery is composed of the re-charged voltage and the offset voltage. That is, when the rated voltage of the battery is 4.4V, the offset voltage is 0.1V if the re-charged voltage is 4.3V, the offset voltage is 0.2V if the re-charged voltage is 4.2V, the offset voltage is 0.3V if the re-charged voltage is 4.1V, the offset voltage is 0.4V if the re-charged voltage is 4.0V, or the offset voltage is 0.6V if the re-charged voltage is 3.8V.

In detail, the mode of adjusting the predetermined voltage of the battery can be a process of adjusting the re-charged voltages in practice. The above-mentioned re-charged voltages 4.3V, 4.2V, 4.1V, 4.0V, and 3.8V are served as a plurality of sample voltages. The sample voltages are combined into a re-charged voltage set. When the discharge current is in the stable state within the predetermined time period, the target voltage is selected from the re-charged voltage set.

In some embodiments, when the battery is charged based on the target voltage, the battery continues to enter a discharge state after reaching a charge complete state. In the meantime, it continues to perform the step of determining whether the discharge current is smaller than the predetermined current threshold value.

In some embodiments, before the selecting the target voltage from the plurality of sample voltages in the predetermined voltage set according to the present discharge current, the method can further include: classifying the plurality of sample voltages in the predetermined voltage set into a plurality of grades to acquire a voltage value corresponding to each of the grades, wherein when the voltage value is smaller, the grade is higher. The selecting the target voltage from the plurality of sample voltages in the predetermined voltage set according to the present discharge current can include: identifying, according to all results of the stable state, a number of times that the discharge current is in the stable state to acquire a stable state sequence; selecting, according to the stable state sequence, a corresponding sample voltage from the plurality of sample voltages in the predetermined voltage set, wherein when the stable state sequence is greater, a grade of the corresponding sample voltage is higher and the voltage value is smaller; and identifying the target voltage according to the voltage value corresponding to the grade of the sample voltage.

In some embodiments, the above-mentioned sample voltages in the re-charged voltage set are classified into the grades. Each of the grades corresponds to a voltage value. When the voltage value is smaller, the grade is greater. For example, a first grade can correspond to a re-charged voltage of 4.3V. A second grade can correspond to a re-charged voltage of 4.2V. A third grade can correspond to a re-charged voltage of 4.1V. A fourth grade can correspond to a re-charged voltage of 4.0V. A fifth grade can correspond to a re-charged voltage of 3.8V.

In some embodiments, in the process of monitoring the discharge current of the battery, the results of the stable state of the discharge current can be sequentially arranged. For example, when the discharge current is in the stable state for a first time within the predetermined time period, a first stable state is marked. When the discharge current is in the stable state for a second time within the predetermined time period, a second stable state is marked. The rest can be deduced from this.

In detail, when the discharge current enters the stable state each time within the predetermined time period, a corresponding re-charged voltage value is selected from the above-mentioned re-charged voltage set. A corresponding relationship is that when the stable state sequence is greater, the grade of the re-charged voltage is higher and the voltage value is smaller. For example, each of the grades can correspond to an adjustment position of a re-charged voltage. When the discharge current is in a first stable state, the adjustment position is adjusted to a first position corresponding to a first grade corresponding to a re-charged voltage of 4.3V. When the discharge current is in a first second stable state, the adjustment position is adjusted to a second position corresponding to a second grade corresponding to a re-charged voltage of 4.2V. The rest can be deduced from this. When the discharge current is in a fifth stable state, the adjustment position is adjusted to a fifth position corresponding to a fifth grade corresponding to a re-charged voltage of 3.8V. The re-charged voltage of 3.8V is served as a target voltage, and the battery is charged with the target voltage.

In some embodiments, after the adopting the target voltage as the charge voltage to charge the battery, the method can further include: stopping charging the battery when a charge current of the battery is smaller than a charge cut-off current.

For example, in the process of charging the battery, the charge current is gradually decreased. Assuming that the charge cut-off current is 200 mA. When the charge current is decreased to be smaller than 200 mA, the battery enters the charge complete state. In the meantime, although the battery is in a state of being continuously connected to an external power source, the battery stops charging.

In some embodiments, the method can further include: adopting a sample voltage corresponding to the discharge current which is in the stable state for a first time as the charge voltage to charge the battery, when the discharge current is greater than or equal to the predetermined current threshold value.

For example, when the measured present discharge current is greater than or equal to the predetermined current threshold value of 100 mA, the sample voltage corresponding to the discharge current which is in the stable state for the first time is adopted as the charge voltage to charge the battery. That is, the re-charged voltage of 4.3V is adopted as the charge voltage of the battery to charge the battery. Herein, the default of the re-charged voltage of the battery is 4.3V. That is, the adjustment is performed according to the first position corresponding to the default re-charged voltage.

The charge method for the battery provided by the present embodiment includes the following steps. First, when the battery is in the charge state, the discharge current of the battery is acquired. Then, it is determined whether the discharge current is smaller than the predetermined current threshold value. Based on the determination result, if yes, it is determined whether the discharge current is in the stable state within the predetermined time period. Finally, the target voltage is selected from the plurality of sample voltages in the predetermined voltage set according to the result of the stable state, the target voltage is adopted as the charge voltage to charge the battery, and it continues to perform the determining whether the discharge current is smaller than the predetermined current threshold value. In the process of discharging the battery of the terminal of the present embodiment, the re-charged voltage is dynamically detected and adjusted. When the battery is continuously connected to an external power source, a situation that the battery is in frequent charge/discharge states can be avoided. Charge and discharge period can be extended, thereby increasing the use life of the battery.

According to the method of the previous embodiment, further detailed explanations are described as follows.

Figure 2:
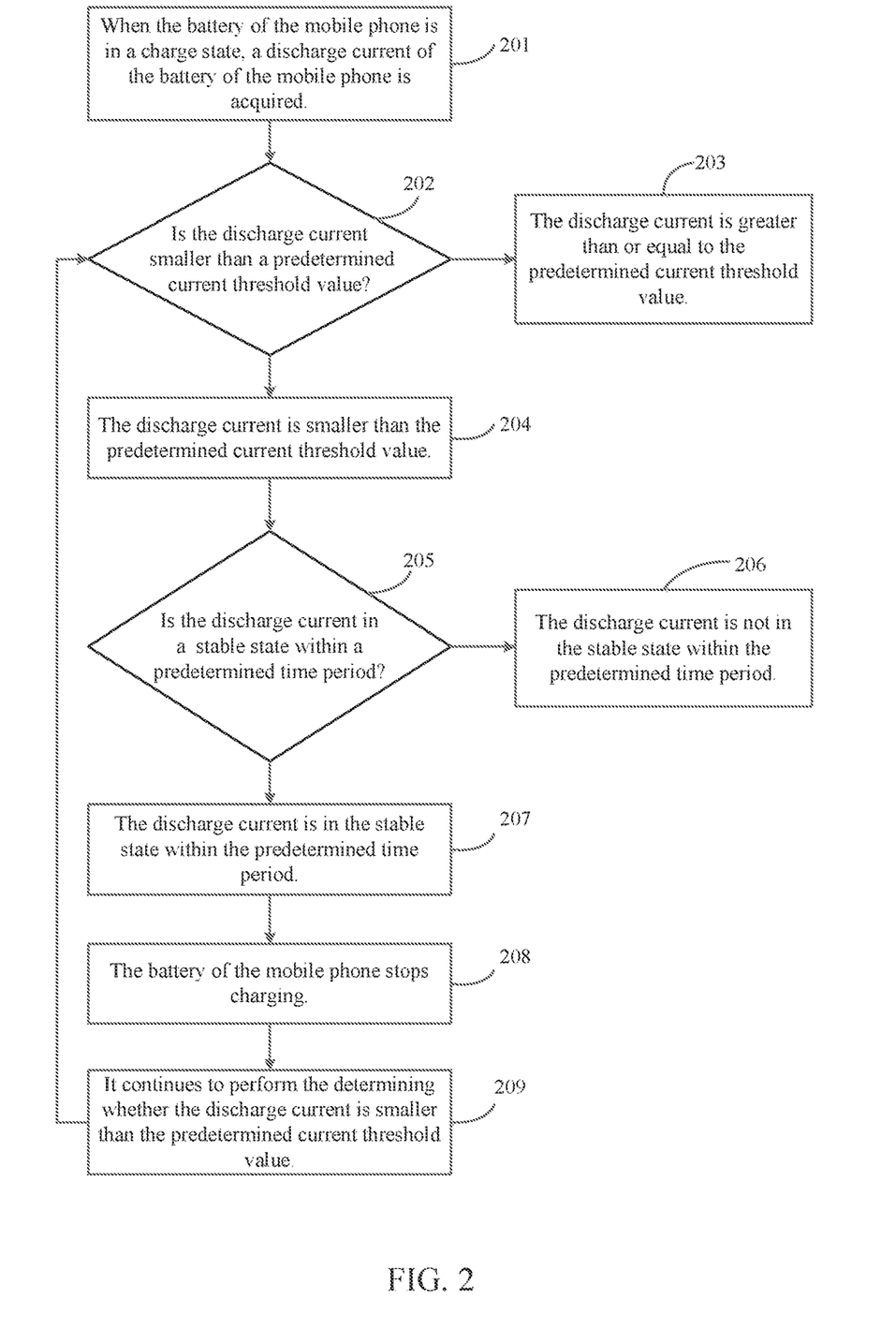
FIG. 2 illustrates a second flow chart of a charge method for a battery provided by an embodiment of the present disclosure.

The present embodiment is described from the angle of a charge device for the battery. The charge device for the battery is embodied to be integrated into a mobile phone. Please refer to FIG. 2. FIG. 2 illustrates a second flow chart of a charge method for a battery provided by an embodiment of the present disclosure. The charge method for the battery includes the following detailed steps.

In step 201, when the battery of the mobile phone is in a charge state, a discharge current of the battery of the mobile phone is acquired.

In some embodiments, in a situation that the mobile phone is continuously connected to a socket or a mobile charge device remains in a connection state, the battery of the mobile phone can be in the charge state, a charge completion state, or a discharge state. It can be determined whether to enter a charge mode according to the displayed battery percentage of the mobile phone. Charge and discharge periods of the battery exist continuously and cyclically.

For example, when the displayed battery percentage of the mobile phone is 0%, the mobile phone is connected to an external power source. When a voltage of the battery is lower than 3.3V, the mobile phone enters a pre-charge mode. When the voltage of the battery reaches a power-on voltage 3.6V, the battery enters a constant current charge mode. This mode is a quick charge mode, and a charge current reaches approximately 3 A. When the voltage of the battery reaches 4.4V, the battery enters a constant voltage charge mode. In this mode, a charge current is gradually decreased until the battery enters a charge complete state. In the meantime, the displayed battery percentage is 100%. Although the mobile phone is still connected to the external power source, the battery is not charged. When the voltage of the battery of the mobile phone is lower than a re-charged voltage, the battery enters the charge state again and repeats the above-mentioned operations.

In some embodiments, when the voltage of the battery of the mobile phone is lower than the present re-charged voltage, a present current which a system consumes (i.e., the discharge current) is acquired.

In step 202, it is determined whether the discharge current is smaller than a predetermined current threshold value.

In some embodiments, the predetermined current threshold value can be correspondingly set up by those skilled in the art. In practical applications, the predetermined current threshold value relates to a range of the above-mentioned discharge current. For example, the above-mentioned discharge current of the battery is ranged from 0 mA to 100 mA, and thus the predetermined current threshold value can be 100 mA.

In step 203, the discharge current is greater than or equal to the predetermined current threshold value.

In some embodiments, when the discharge current is greater than or equal to the predetermined current threshold value, a sample voltage corresponding to the discharge current which is in a stable state for a first time is adopted as a charge voltage to charge the battery.

For example, when the measured present discharge current is greater than or equal to the predetermined current threshold value of 100 mA, the sample voltage corresponding to the discharge current which is in the stable state for the first time is adopted as the charge voltage to charge the battery. That is, the re-charged voltage of 4.3V is adopted as the charge voltage of the battery to charge the battery. Herein, the default of the re-charged voltage of the battery is 4.3V. That is, the adjustment is performed according to the first position corresponding to the default re-charged voltage.

In step 204, the discharge current is smaller than the predetermined current threshold value.

In some embodiments, when the discharge current is smaller than the predetermined current threshold value, step 205 is performed.

In step 205, it is determined whether the discharge current is in a stable state within a predetermined time period.

In some embodiments, based on step 204, stability of the present discharge current within the predetermined time period is monitored. For example, a timer can be set up within this discharge process, and time of the timer can be set as 15 minutes. An average value of the discharge current of the battery within 15 minutes is measured. When the discharge current does not have a jump change after a calculation, it is determined that the discharge current is in the stable state within 15 minutes.

In step 206, the discharge current is not in the stable state within the predetermined time period.

In some embodiments, based on step 205 of monitoring the stability of the present discharge current, when the discharge current is not in the stable state within the predetermined time period, a reason of this situation is that a user is using the terminal to consume large power. Accordingly, the discharge current has a jump change, and the charge voltage of the battery is changed as well. It is necessary to remain the present charge voltage.

In step 207, the discharge current is in the stable state within the predetermined time period.

In some embodiments, based on step 205 of monitoring the stability of the present discharge current, when the discharge current is in the stable state within the predetermined time period, the system of the mobile phone might be in a standby state and there is no large power consumption. The battery enters a mode of adjusting a re-charged voltage. In this mode, a target voltage is selected from a plurality of sample voltages in a re-charged voltage set according to a result of monitoring the stability, and the target voltage is adopted as a charge voltage to charge the battery.

In some embodiments, a detailed process of the mode of adjusting the re-charged voltage can include the following steps. First, according to the monitoring of the stability of the discharge current of the battery, a number of times that the discharge current is in the stable state is identified to acquire a stable state sequence within the predetermined time period. When the discharge current is in the stable state for a first time within the predetermined time period, a first stable state is marked. When the discharge current is in the stable state for a second time within the predetermined time period, a second stable state is marked. The rest can be deduced from this. Then, since each stable state corresponds to one re-charged voltage, plural re-charged voltages are combined into a re-charged voltage set. The above-mentioned sample voltages in the re-charged voltage set are classified into grades. Each of the grades corresponds to a voltage value. When the voltage value is smaller, the grade is greater. When the battery is in the first stable state, a re-charged voltage corresponding to a first grade corresponding to the first stable state is selected from the re-charged voltage set. The voltage value is a maximum voltage value in the re-charged voltage set. Finally, according to the limitation that when the stable state sequence is greater, a grade corresponding to a sample voltage is greater and a voltage value is smaller, the target voltage is selected from the re-charged voltage set, and the target voltage is adopted as the charge voltage to charge the battery.

In step 208, the battery of the mobile phone stops charging.

In some embodiments, after the target voltage is adopted as the charge voltage to charge the battery, the battery stops charging when a charge current of the battery is smaller than a charge cut-off current.

In step 209, it continues to perform the determining whether the discharge current is smaller than the predetermined current threshold value.

In some embodiments, the above-mentioned mode of adjusting the re-charged voltage is a cyclic process. A main objective is to extend the charge and discharge periods of the battery of the mobile phone as much as possible. Accordingly, the process of adjusting the re-charged voltage can be repeated. That is, it continues to perform the determining whether the discharge current is smaller than the predetermined current threshold value.

It can be appreciated from the above that the charge method for the battery provided by the present embodiment includes the following steps. First, when the battery is in the charge state, the discharge current of the battery is acquired. Then, it is determined whether the discharge current is smaller than the predetermined current threshold value. Based on the determination result, if yes, it is determined whether the discharge current is in the stable state within the predetermined time period. Finally, the target voltage is selected from the plurality of sample voltages in the predetermined voltage set according to the result of the stable state, the target voltage is adopted as the charge voltage to charge the battery, and it continues to perform the determining whether the discharge current is smaller than the predetermined current threshold value. In the process of discharging the battery of the terminal of the present embodiment, the re-charged voltage is dynamically detected and adjusted. When the battery is continuously connected to an external power source, a situation that the battery is in frequent charge/discharge states can be avoided. Charge and discharge periods can be extended, thereby increasing the use life of the battery.

Figure 3:
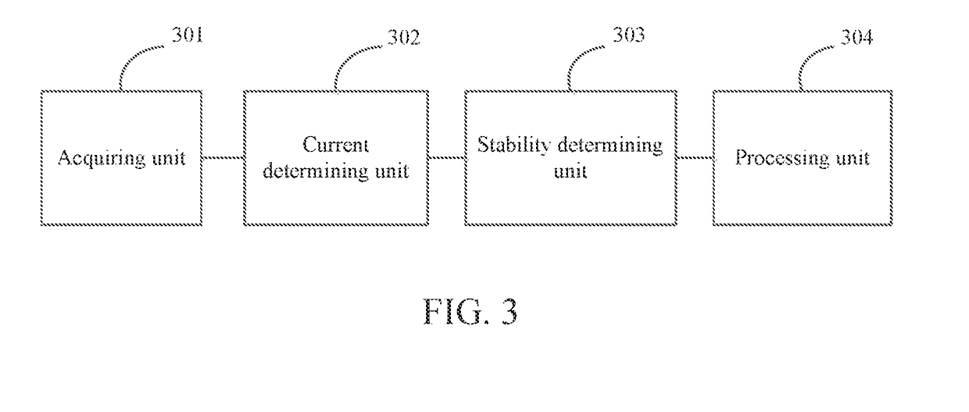
FIG. 3 illustrates a first structure diagram of a charge device for a battery provided by an embodiment of the present disclosure.

In order to better implement the above-mentioned methods, an embodiment of the present disclosure further provides a charge device for a battery. As shown in FIG. 3, FIG. 3 illustrates a first structure diagram of a charge device for a battery provided by an embodiment of the present disclosure. The charge device for the battery can include an acquiring unit 301, a current determining unit 302, a stability determining unit 303, and a processing unit 304. Detailed explanations are described as follows.

(1) The Acquiring Unit 301

The acquiring unit 301 is configured to acquire a discharge current of the battery when the battery is in a charge state.

In some embodiments, the acquiring unit 301 can be specifically configured to acquire the discharge current of the battery when the battery is in the charge state in a situation that the battery is continuously connected to an external power source. In the situation, a state of the battery can be the charge state, a charge completion state, or a discharge state.

A process of acquiring the discharge current of the battery can be referred to the embodiment of the above-mentioned method and is not repeated herein.

(2) The Current Determining Unit 302

The current determining unit 302 is configured to determine whether the discharge current is smaller than a predetermined current threshold value.

In some embodiments, the predetermined current threshold value can be correspondingly set up by those skilled in the art for the current determining unit 302. In practical applications, the predetermined current threshold value relates to a range of the above-mentioned discharge current.

A process of determining the discharge current of the battery can be referred to the embodiment of the above-mentioned method and is not repeated herein.

(3) The Stability Determining Unit 303

The stability determining unit 303 is configured to determine whether the discharge current is in a stable state within a predetermined time period.

In some embodiments, the stability determining unit 303 can be specifically configured to monitor stability of the present discharge current within the predetermined time period when the discharge current is smaller than the predetermined current threshold value.

Figure 4:
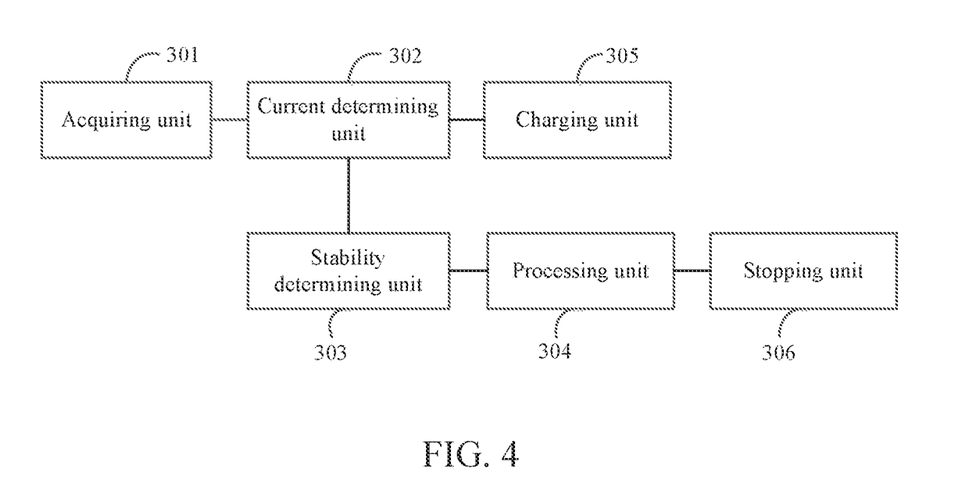
FIG. 4 illustrates a second structure diagram of a charge device for a battery provided by an embodiment of the present disclosure.

Optionally, in some embodiments, as shown in FIG. 4, the charge device for the battery can further include a charging unit 305.

The charging unit 305 is configured to adopt a sample voltage corresponding to the discharge current which is in the stable state for a first time as a charge voltage to charge the battery when the discharge current is greater than or equal to the predetermined current threshold value.

A process of determining the stability of the battery can be referred to the embodiment of the above-mentioned method and is not repeated herein.

(4) The Processing Unit 304

The processing unit 304 is configured to select a target voltage from a plurality of sample voltages in a predetermined voltage set according to a result of the stable state, adopt the target voltage as a charge voltage to charge the battery, and continue to perform the determining whether the discharge current is smaller than the predetermined current threshold value.

For example, the processing unit 304 can be specifically configured to: select the target voltage from the plurality of sample voltages in the predetermined voltage set according to the present discharge current, when the discharge current is in the stable state within the predetermined time period; and remain a present charge voltage, when the discharge current is not in the stable state within the predetermined time period.

For example, before the target voltage is selected from the plurality of sample voltages in the predetermined voltage set according to the present discharge current, the processing unit 304 can be specifically configured to: classify the plurality of sample voltages in the predetermined voltage set into a plurality of grades to acquire a voltage value corresponding to each of the grades, wherein when the voltage value is smaller, the grade is higher; identify a number of times that the discharge current is in the stable state to acquire a stable state sequence; select a corresponding sample voltage from the plurality of sample voltages in the predetermined voltage set, wherein when the stable state sequence is greater, a grade of the corresponding sample voltage is higher and the voltage value is smaller; and identify the target voltage according to the voltage value corresponding to the grade of the sample voltage.

In some embodiments, the processing unit 304 can be configured to:

select the target voltage from the plurality of sample voltages in the predetermined voltage set according to the present discharge current, when the discharge current is in the stable state within the predetermined time period; and remain a present charge voltage, when the discharge current is not in the stable state within the predetermined time period.

In some embodiments, the charge device for the battery can further include:

a classifying unit configured to classify the plurality of sample voltages in the predetermined voltage set into a plurality of grades to acquire a voltage value corresponding to each of the grades before the target voltage is selected from the plurality of sample voltages in the predetermined voltage set according to the present discharge current, wherein when the voltage value is smaller, the grade is higher.

In some embodiments, the processing unit 304 can be configured to:

identify, according to all results of the stable state, a number of times that the discharge current is in the stable state to acquire a stable state sequence;

select, according to the stable state sequence, a corresponding sample voltage from the plurality of sample voltages in the predetermined voltage set, wherein when the stable state sequence is greater, a grade of the corresponding sample voltage is higher and the voltage value is smaller; and identify the target voltage according to the voltage value corresponding to the grade of the sample voltage.

In some embodiments, the charge device for the battery can further include:

a charging unit configured to adopt a sample voltage corresponding to the discharge current which is in the stable state for a first time as a charge voltage to charge the battery when the discharge current is greater than or equal to the predetermined current threshold value.

In some embodiments, as shown in FIG. 4, the charge device for the battery can further include a stopping unit 306.

The stopping unit 306 is configured to stop charging the battery when a charge current of the battery is smaller than a charge cut-off current, after the target voltage is adopted as the charge voltage to charge the battery.

In some embodiments, the discharge current is ranged from 0 mA to 100 mA.

A detailed process of the processing unit 304 can be referred to the embodiment of the above-mentioned method and is not repeated herein.

In specific implementations, the above-mentioned units can be respectively embodied as an independent entity or be combined as the same one entity or a plurality of entities. The specific implementations of the above-mentioned units can be referred to the embodiment of the above-mentioned method and are not repeated herein.

It can be appreciated from the above that the present embodiment is described as follows. First, when the battery is in the charge state, the acquiring unit 301 is configured to acquire the discharge current of the battery. Then, the current determining unit 302 is configured to determine whether the discharge current is smaller than the predetermined current threshold value. Based on the determination result, if yes, the stability determining unit 303 is configured to determine whether the discharge current is in the stable state within the predetermined time period. Finally, the processing unit 304 is configured to select the target voltage from the plurality of sample voltages in the predetermined voltage set according to the result of the stable state, adopt the target voltage as the charge voltage to charge the battery, and continue to perform the determining whether the discharge current is smaller than the predetermined current threshold value. In the process of discharging the battery of the terminal of the present embodiment, the re-charged voltage is dynamically detected and adjusted. When the battery is continuously connected to an external power source, a situation that the battery is in frequent charge/discharge states can be avoided. Charge and discharge periods can be extended, thereby increasing the use life of the battery.

Figure 5:
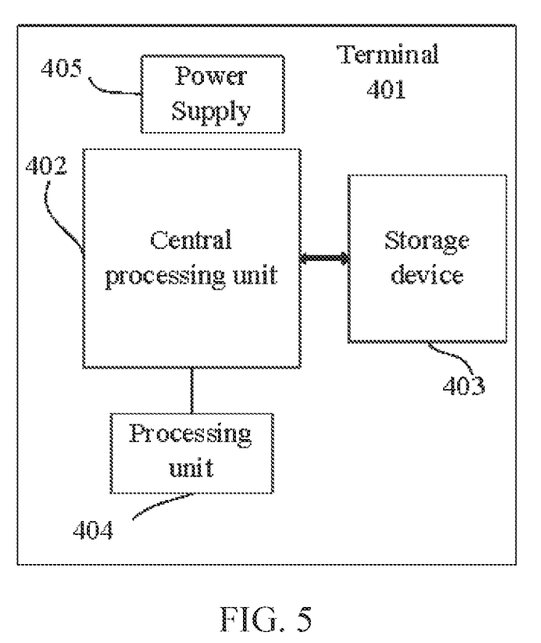
FIG. 5 illustrates a detailed structure block diagram of a terminal provided by an embodiment of the present disclosure.

Correspondingly, an embodiment of the present disclosure further provides a terminal 401. The terminal 401 can be a smart mobile phone or a tablet. As shown in FIG. 5, FIG. 5 illustrates a detailed structure block diagram of a charge terminal 401 of a battery provided by an embodiment of the present disclosure.

It can be appreciated from FIG. 5 that the terminal 401 can include a central processing unit 402 including one or more processing cores, a storage device 403 connected to the central processing unit 402 and including one or more computer readable storage medium, an adjusting a processing unit 404, and a power supply 405. FIG. 5 only illustrates some components of the terminal 401. However, it should be understood that not all illustrated components are required to be implemented, and more or fewer components may be implemented instead.

The central processing unit (CPU) 402 is a control center of the terminal 401, connected with all the parts of the whole terminal 401 by various interfaces and lines, configured to execute various functions of the terminal 401 and process data by operating software programs and/or modules stored in the storage device 403 and calling data stored in the storage device 403 so as to carry out integral monitoring on the terminal 401. Optionally, the central processing unit 402 can include one or more processing cores. Preferably, the central processing unit 402 can be integrated into an application processor or a modulation/demodulation processor. The application processor mainly processes an operating system, user interfaces, and applications. The modulation/demodulation processor mainly processes wireless communications. It can be appreciated that the modulation/demodulation processor may be not integrated into the central processing unit 402.

The storage device 403 can be configured to store software programs and/or modules installed in the terminal 401 for executing various functional applications and data processing. The storage device 403 can include a storage program area and a storage data area. The storage program area can store the operating system and at least one functionally required application program. The storage data area can store data created according to the use of the terminal 401.

In detail, in some embodiments, the storage device 403 can be an internal storage unit of the terminal 401, such as a hard disk or memory of the terminal 401. In some embodiments, the storage device 403 also can be an external storage device of the terminal 401, such as a plug-in hard disk, smart media card (SMC), secure digital (SD) card, etc. Further, the storage device 403 can also include both the internal storage unit and the external storage device of the terminal 401.

The terminal 401 further includes a power supply 405 configured to supply power to each part. Preferably, the power supply 405 can be logically connected with the processor 402 by a power supply management system, so as to implement functions of charge management, discharge management, power consumption management and the like by the power supply management system. The power supply 405 can further include one or more direct current or alternating current power supplies, recharging systems, power supply failure detection circuits, power converters or inverters, power supply status indicators and the like.

The terminal 401 can further include the processing unit 404. The processing unit 404 can be configured to cause, when a discharge current of a battery of the terminal 401 is smaller than a predetermined current threshold value, the battery to enter a mode of adjusting a predetermined voltage, adjust the predetermined voltage to acquire a target voltage within the mode, and charge the battery with the target voltage.

In the present embodiment, the central processing unit 402 of the terminal 401 loads, according to the following instructions, one or more executable files corresponding to programs of applications into the storage device 403, and the central processing unit 402 runs the applications stored in the storage device 403 to implement various functions. Detailed steps include:

acquiring a discharge current of the battery when the battery is in a charge state;

determining whether the discharge current is smaller than a predetermined current threshold value;

if yes, determining whether the discharge current is in a stable state within a predetermined time period; and selecting a target voltage from a plurality of sample voltages in a predetermined voltage set according to a result of the stable state, adopting the target voltage as a charge voltage to charge the battery, and continuing to perform the determining whether the discharge current is smaller than the predetermined current threshold value.

In some embodiments, in the selecting the target voltage from the plurality of sample voltages in the predetermined voltage set according to the present discharge current, the central processing unit 402 is configured to perform the following steps by calling computer programs stored in the storage device 403:

selecting the target voltage from the plurality of sample voltages in the predetermined voltage set according to the present discharge current, when the discharge current is in the stable state within the predetermined time period; and remaining a present charge voltage, when the discharge current is not in the stable state within the predetermined time period.

In some embodiments, before the selecting the target voltage from the plurality of sample voltages in the predetermined voltage set according to the present discharge current, the central processing unit 402 is further configured to perform the following steps of by calling the computer programs stored in the storage device 403:

classifying the plurality of sample voltages in the predetermined voltage set into a plurality of grades to acquire a voltage value corresponding to each of the grades, wherein when the voltage value is smaller, the grade is higher.

In some embodiments, in the selecting the target voltage from the plurality of sample voltages in the predetermined voltage set according to the present discharge current, the central processing unit 402 is further configured to perform the following steps of by calling the computer programs stored in the storage device 403:

identifying, according to all results of the stable state, a number of times that the discharge current is in the stable state to acquire a stable state sequence;

selecting, according to the stable state sequence, a corresponding sample voltage from the plurality of sample voltages in the predetermined voltage set, wherein when the stable state sequence is greater, a grade of the corresponding sample voltage is higher and the voltage value is smaller; and identifying the target voltage according to the voltage value corresponding to the grade of the sample voltage.

In some embodiments, when the discharge current is greater than or equal to the predetermined current threshold value, the central processing unit 402 is configured to perform the following steps of by calling the computer programs stored in the storage device 403:

adopting a sample voltage corresponding to the discharge current which is in the stable state for a first time as the charge voltage to charge the battery.

In some embodiments, after the adopting the target voltage as the charge voltage to charge the battery, the central processing unit 402 is further configured to perform the following steps of by calling the computer programs stored in the storage device 403:

stopping charging the battery when a charge current of the battery is smaller than a charge cut-off current.

In some embodiments, the discharge current is ranged from 0 mA to 100 mA.

The above-mentioned operations can be referred to the above-mentioned embodiments and are not repeated herein.

It can be appreciated from the above that the present embodiment aims to dynamically detect and adjust the re-charged voltage when compared to the prior art. When the battery is continuously connected to an external power source, a situation that the battery is in frequent charge/discharge states can be avoided. Charge and discharge periods can be extended, thereby increasing the use life of the battery.

Those skilled in the art can appreciated that all or some steps in the above-mentioned methods of the embodiments can be completed by instructions or completed by controlling corresponding hardware by instructions. The instructions can be stored in a computer readable storage medium and are loaded and run by a processor.

As such, an embodiment of the present disclosure provides a storage medium storing a plurality of instructions therein. The instructions can be loaded by a central processing unit to perform the steps in a charge method for a battery provided by any one embodiment of the present disclosure. For example, the instructions can perform the following steps of:

acquiring a discharge current of the battery when the battery is in a charge state; determining whether the discharge current is smaller than a predetermined current threshold value; if yes, determining whether the discharge current is in a stable state within a predetermined time period; and selecting a target voltage from a plurality of sample voltages in a predetermined voltage set according to a result of the stable state, adopting the target voltage as a charge voltage to charge the battery, and continuing to perform the determining whether the discharge current is smaller than the predetermined current threshold value.

The above-mentioned operations can be referred to the above-mentioned embodiments and are not repeated herein.

The storage medium can include a read only memory (ROM), a random access memory (RAM), a disk, an optical disk and so on.

Since the instructions stored in the storage medium can perform the steps in a charge method for a battery provided by any one embodiment of the present disclosure, advantageous effects in a charge method for a battery provided by any one embodiment of the present disclosure can be achieved. The advantageous effects can be referred to the above-mentioned embodiments and are not repeated herein.

The charge method and device for the battery, the storage medium, and the terminal provided by the embodiments of the present disclosure are described in detail as above. The embodiments are used to describe the principle and the implementations of the present disclosure. It should be understood that present disclosure is not limited to the exemplary examples. One of ordinary skill in the art may achieve equivalent improvements or replacements according to the above description. The equivalent improvements and replacements should be considered to belong to the protection scope of the present disclosure.

What is claimed is:

1. A charge method for a battery, comprising:

acquiring a discharge current of the battery when the battery is in a charge state;

determining whether the discharge current is smaller than a predetermined current threshold value;

determining, in response to determining that the discharge current is smaller than the predetermined current threshold value, whether the discharge current is in a stable state within a predetermined time period; and selecting a target voltage from a plurality of sample voltages in a predetermined voltage set according to a result of determining whether the discharge current is in the stable state, adopting the target voltage as a charge voltage to charge the battery, and continuing to perform the determining whether the discharge current is smaller than the predetermined current threshold value.

2. The method of claim 1, wherein the selecting the target voltage from the plurality of sample voltages in the predetermined voltage set according to the result of determining whether the discharge current is in the stable state comprises:
  selecting the target voltage from the plurality of sample voltages in the predetermined voltage set according to the discharge current, when the discharge current is in the stable state within the predetermined time period; and
  remaining a present charge voltage, when the discharge current is not in the stable state within the predetermined time period.

3. The method of claim 2, wherein before the selecting the target voltage from the plurality of sample voltages in the predetermined voltage set according to the discharge current, the method further comprises:
  classifying the plurality of sample voltages in the predetermined voltage set into a plurality of grades to acquire a voltage value corresponding to each of the grades, wherein when the voltage value is smaller, the grade is higher.

4. The method of claim 3, wherein the selecting the target voltage from the plurality of sample voltages in the predetermined voltage set according to the discharge current comprises:
  identifying, according to all results of determining whether the discharge current is in the stable state, a number of times that the discharge current is in the stable state to acquire a stable state sequence;
  selecting, according to the stable state sequence, a corresponding sample voltage from the plurality of sample voltages in the predetermined voltage set, wherein when the stable state sequence is greater, a grade of the corresponding sample voltage is higher and the voltage value is smaller; and
  identifying the target voltage according to the voltage value corresponding to the grade of the corresponding sample voltage.

5. The method of claim 4, further comprising:
  adopting a sample voltage corresponding to the discharge current which is in the stable state for a first time as the charge voltage to charge the battery, when the discharge current is greater than or equal to the predetermined current threshold value.

6. The method of claim 1, wherein after the adopting the target voltage as the charge voltage to charge the battery, the method further comprises:
  stopping charging the battery when a charge current of the battery is smaller than a charge cut-off current.

7. The method of claim 1, wherein the discharge current is ranged from 0 milliampere to 100 milliamperes.

8. A non-volatile computer readable storage medium, wherein the computer readable storage medium stores computer programs therein, and the computer programs are called by a central processing unit to perform the following steps of:
  acquiring a discharge current of the battery when the battery is in a charge state;
  determining whether the discharge current is smaller than a predetermined current threshold value;
  determining, in response to determining that the discharge current is smaller than the predetermined current threshold value, whether the discharge current is in a stable state within a predetermined time period; and
  selecting a target voltage from a plurality of sample voltages in a predetermined voltage set according to a result of determining whether the discharge current is in the stable state, adopting the target voltage as a charge voltage to charge the battery, and continuing to perform the determining whether the discharge current is smaller than the predetermined current threshold value.

9. The non-volatile computer readable storage medium of claim 8, wherein in the selecting the target voltage from the plurality of sample voltages in the predetermined voltage set according to the result of determining whether the discharge current is in the stable state, the computer programs are called by the central processing unit to perform the following steps of:
  selecting the target voltage from the plurality of sample voltages in the predetermined voltage set according to the discharge current, when the discharge current is in the stable state within the predetermined time period; and
  remaining a present charge voltage, when the discharge current is not in the stable state within the predetermined time period.

10. The non-volatile computer readable storage medium of claim 9, wherein before the selecting the target voltage from the plurality of sample voltages in the predetermined voltage set according to the discharge current, the computer programs are called by the central processing unit to further perform the following steps of:
  classifying the plurality of sample voltages in the predetermined voltage set into a plurality of grades to acquire a voltage value corresponding to each of the grades, wherein when the voltage value is smaller, the grade is higher.

11. The non-volatile computer readable storage medium of claim 10, wherein in the selecting the target voltage from the plurality of sample voltages in the predetermined voltage set according to the discharge current, the computer programs are called by the central processing unit to perform the following steps of:
  identifying, according to all results of determining whether the discharge current is in the stable state, a number of times that the discharge current is in the stable state to acquire a stable state sequence;
  selecting, according to the stable state sequence, a corresponding sample voltage from the plurality of sample voltages in the predetermined voltage set, wherein when the stable state sequence is greater, a grade of the corresponding sample voltage is higher and the voltage value is smaller; and
  identifying the target voltage according to the voltage value corresponding to the grade of the corresponding sample voltage.

12. The non-volatile computer readable storage medium of claim 11, wherein when the discharge current is greater than or equal to the predetermined current threshold value, the computer programs are called by the central processing unit to perform the following steps of:
  adopting a sample voltage corresponding to the discharge current which is in the stable state for a first time as the charge voltage to charge the battery.

13. The non-volatile computer readable storage medium of claim 8, wherein after the adopting the target voltage as the charge voltage to charge the battery, the computer programs are called by the central processing unit to further perform the following steps of:
  stopping charging the battery when a charge current of the battery is smaller than a charge cut-off current.

14. The non-volatile computer readable storage medium of claim 8, wherein the discharge current is ranged from 0 milliampere to 100 milliamperes.

15. A terminal, comprising a central processing unit and a storage device, wherein the storage device stores computer programs therein, and the computer programs stored in the storage device are called by the central processing unit to perform the following steps of:
    acquiring a discharge current of the battery when the battery is in a charge state;
    determining whether the discharge current is smaller than a predetermined current threshold value;
    determining, in response to determining that the discharge current is smaller than the predetermined current threshold value, whether the discharge current is in a stable state within a predetermined time period; and
    selecting a target voltage from a plurality of sample voltages in a predetermined voltage set according to a result of determining whether the discharge current is in the stable state, adopting the target voltage as a charge voltage to charge the battery, and continuing to perform the determining whether the discharge current is smaller than the predetermined current threshold value.

16. The terminal of claim 15, wherein in the selecting the target voltage from the plurality of sample voltages in the predetermined voltage set according to the result of determining whether the discharge current is in the stable state, the computer programs stored in the storage device are called by the central processing unit to perform the following steps of:
    selecting the target voltage from the plurality of sample voltages in the predetermined voltage set according to the discharge current, when the discharge current is in the stable state within the predetermined time period; and
    remaining a present charge voltage, when the discharge current is not in the stable state within the predetermined time period.

17. The terminal of claim 16, wherein before the selecting the target voltage from the plurality of sample voltages in the predetermined voltage set according to the discharge current, the computer programs stored in the storage device are called by the central processing unit to further perform the following steps of:
    classifying the plurality of sample voltages in the predetermined voltage set into a plurality of grades to acquire a voltage value corresponding to each of the grades, wherein when the voltage value is smaller, the grade is higher.

18. The terminal of claim 17, wherein in the selecting the target voltage from the plurality of sample voltages in the predetermined voltage set according to the discharge current, the computer programs stored in the storage device are called by the central processing unit to perform the following steps of:
    identifying, according to all results of determining whether the discharge current is in the stable state, a number of times that the discharge current is in the stable state to acquire a stable state sequence;
    selecting, according to the stable state sequence, a corresponding sample voltage from the plurality of sample voltages in the predetermined voltage set, wherein when the stable state sequence is greater, a grade of the corresponding sample voltage is higher and the voltage value is smaller; and
    identifying the target voltage according to the voltage value corresponding to the grade of the corresponding sample voltage.

19. The terminal of claim 18, wherein when the discharge current is greater than or equal to the predetermined current threshold value, the computer programs stored in the storage device are called by the central processing unit to perform the following steps of:
    adopting a sample voltage corresponding to the discharge current which is in the stable state for a first time as the charge voltage to charge the battery.

20. The storage medium of claim 15, wherein after the adopting the target voltage as the charge voltage to charge the battery, the computer programs stored in the storage device are called by the central processing unit to further perform the following steps of:
    stopping charging the battery when a charge current of the battery is smaller than a charge cut-off current.

* * * * *